(12) United States Patent
Cowan et al.

(10) Patent No.: US 6,714,647 B1
(45) Date of Patent: Mar. 30, 2004

(54) NETWORK INTERFACE UNIT WITH SUBSCRIBER LINE DAUGHTER BOARDS

(75) Inventors: Douglas Lewis Cowan, Snellville, GA (US); Jason A. Kay, Morristown, NJ (US); David Stevens Kerr, Morris Plains, NJ (US); Ronald Marchisin, Tobyhanna, PA (US); Ivan Pawlenko, Holland, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/409,288

(22) Filed: Sep. 30, 1999

(51) Int. Cl.[7] ................................................. H04M 1/00
(52) U.S. Cl. ........................ 379/413.02; 379/93.07; 379/399.01; 379/413.04
(58) Field of Search ....................... 379/399.01, 413.02, 379/413.04, 93.05, 93.07

(56) References Cited

U.S. PATENT DOCUMENTS

| | | | | |
|---|---|---|---|---|
| 5,550,824 A | * | 8/1996 | Belcher | 370/485 |
| 5,946,386 A | * | 8/1999 | Rogers et al. | 379/265.09 |
| 5,974,139 A | * | 10/1999 | McNamara et al. | 379/399 |
| 6,139,333 A | * | 10/2000 | Green et al. | 439/49 |
| 6,229,890 B1 | * | 5/2001 | Kerr et al. | 379/413.02 |
| 6,356,537 B1 | * | 3/2002 | Jaakkola et al. | 370/310.2 |
| 6,469,630 B1 | * | 10/2002 | Jeske et al. | 340/635 |

* cited by examiner

Primary Examiner—Binh Tieu
(74) Attorney, Agent, or Firm—Birch, Stewart, Kolasch & Birch, LLP

(57) ABSTRACT

The present invention provides an improved communications interface device for existing interface devices, capable of providing improved and enhanced functional features to the traditional limited services of telephone-based and communications interface devices without requiring modification to physical characteristics of existing interface devices. The apparatus includes a module having electrical connectors for establishing electrical connection to one or more service provider cables and one or more subscriber cables and a replaceable motherboard and one or more replaceable daugbterboards capable of providing access to additional bandwidth, sharing of bandwidth, access to high-speed and multimedia data, distribution of data by residential gateways and/or across existing telephone wiring, access to cable-related data, analog to digital conversion of data, or power surge damage-protection.

13 Claims, 4 Drawing Sheets

NETWORK INTERFACE UNIT WITH SUBSCRIBER LINE DAUGHTER BOARDS

BACKGROUND OF THE INVENTION

1. Field of Invention

The present invention relates generally to improved distribution of data across telephone lines in communication architectures and systems.

2. Description of the Prior Art

Communication service providers are experiencing significant consumer demands to accommodate additional bandwidth and traffic capacity in existing and new communications systems. Additionally, service providers are experiencing increased consumer demands for multimedia, high speed data access, residential gateway functions, smart homes capabilities, and cable-related data traffic use on-site in the premises of a subscriber's home. To satisfy this increasing demand, service providers have decentralized the location of equipment, added additional components, and upgraded services using improved electronics and related devices. However, certain equipment such as Network Interface Devices (NIDs) and Network Interface Units (NIUs) either lack the ability to expand to meet these demands or are inadequate for the level of sophisticated features and/or functionality required.

NIDs typically house telephone line junctions and terminals, and provide separate panel accesses to subscribers and service providers. In order to add additional telephone lines to a NID, additional line modules or terminals are physically installed at the NID. The NID is typically limited to six (6) line terminals and therefore up to twelve (12) subscriber telephone numbers. NIDs, however, often lack the circuitry and/or functionality to permit increased line and data speeds, as well as the sharing and interaction of line services, as examples.

FIG. 1 depicts a typical network interface device 10 having a network interface module 50, a testjack receptacle 52, a first cover 32 and a second cover 12, which is securably closeable by a male fastener 18 in cooperation with a female connection 45. It is understood that variations of the NID are known and deployed in practice, wherein such variations are incorporated herein.

NIUs often house a fixed set of telephone lines with limited or no expansion capability. The NIU provides limited functional enhancements over the NID and usually has a fixed number of lines available. However the limited line expandability of the NIU as well as the lack of capability to provide for data sharing and access of multimedia data across existing on-premise telephone render the NIU inadequate to satisfy growing subscriber demands.

Unfortunately, present NID and NIU designs lack the features and functionality necessary for service providers to meet the customer demands for features stated previously. Often the capability of these devices to provide broad bandwidth transport functionality is unavailable, and consequently the ability to carry quality voice, video, and data transmissions simultaneously is not possible. Further the ability to share and distribute data across existing telephone lines, utilize cable-related data services, and utilize in-house wiring as an intra-local area network, is also not possible. Therefore, the ability to carry these desired service features in combination with high-speed and multimedia services, in addition to traditional subscriber control signals and telephone service, has proved desirable. Additionally, it is believed in the art, that a NID or NIU equipped with additional functional features, such as those discussed above, would be very expensive to build and that costs of repair would also be prohibitive. Options presented in the art typically are limited to the addition of new wiring or re-worked wiring at the premises. The modification or addition of wiring and/or devices to a premises often requires significant construction efforts and costs. These options do not address nor resolve the problems related to the needed functional service features (i.e. functional features) previously discussed, nor to the sharing and distribution of data in a manner to optimize existing lines on or at a subscriber's premises.

Accordingly, there exists a need to economically and simply provide a replaceable apparatus for installation within NIDs, NIUs and similar communication devices which provides for desired and expandable functional features including multimedia access, high speed data access, residential gateway functions, data distribution capabilities across existing telephone wiring at a residence, access to cable-related data traffic across these same lines, and analog to digital conversion.

There also exists the need to provide a solution which further enables the sharing of subscriber line resources to optimize the distribution of data to and throughout a subscriber's premises using existing wiring and resources.

There exists a further need to provide for a device incorporating a replaceable apparatus comprising electronic circuitry and having desired functional features previously discussed for use in new construction where a retrofit is not required.

There further exists a need for a solution which, as a device or as an apparatus in combination with an existing NID or NIU, substantially provides for local area network (LAN) interconnectivity within a premise using existing telephone wiring.

SUMMARY OF THE INVENTION

The present invention provides an economical solution of an improved communications interface device and a functional module apparatus for existing interface devices. The invention is capable of providing the desired functional features of additional bandwidth, sharing of bandwidth, access to high-speed and multimedia data, distribution of data by residential gateways and/or across existing telephone wiring, access to cable-related data, analog to digital conversion of data, and power surge damage-protection such as from a lightning strike. These improvements to a NID or an NIU and the like can be made without modification to the physical characteristics of the existing interface device.

The invention further provides a solution for simple upgrading and replacement of damaged devices at minimal expense by utilizing electronic circuitry, such as motherboards and daughterboards, having at least one of the functional features previously discussed.

The invention further provides for simple upgrading of new or improved devices at minimal expense by interchangeably segregating functional features of the devices into core functional apparatus and secondary functional apparatus, wherein the core apparatus are often motherboards and the secondary apparatus are often daughterboards, each having at least one of the functional features previously discussed.

The invention also provides a solution for adding additional functional features at an existing or improved interface device junction by providing for adaptable connections on a secondary functional apparatus for electrically connecting with a core functional apparatus or the loop service provider line at an existing NID and the like, wherein the secondary functional apparatus comprises enhanced circuitry or daughterboards having upgraded capabilities and/ or functional features.

The invention also provides a solution for providing LAN interconnectivity within a premises using existing wiring with either an improved communications device of the present invention, the device of the present invention positioned subsequent to an existing NID, or the apparatus of the present invention within an existing interface device, in which each is positioned along a subscriber line or combination thereof.

In general the invention provides for an improved communications interface device and a functional module apparatus for existing interface devices such as a NID, NIU or the like. The device comprises an interface housing and functional apparatus. The apparatus may be replaceably secured to an existing interface device or to the housing of the present invention. Both the device and the apparatus provide additional functional features at an interface connection point or to a NID, NIU and the like.

The functional apparatus comprise a motherboard and one or more daughterboards, wherein each functional apparatus provides for certain functional features in relation to the type of feature desired in the design. In other words, where the functional feature is deemed to be a common feature, such as enhanced bandwidth access, the feature may be a part of the motherboards. Similarly, wherein a feature is deemed to require replacement (e.g. lightning protection), is an optional feature or is of a lesser significance, such a feature may reside on a daughterboard. It is understood that the functionality of the features for the use, access, distribution, dissemination, sharing, relay, transmission, receipt, conversion, emulation, interconnectivity of data, and the like may reside on either the motherboard or the daughterboard, in full or in part.

By way of example and not of limitation, the motherboard may comprise circuitry providing one or more of the following features: receipt of data, transmission of data, lightning and surge protection, data and signal test access, daughterboard mounting and routing, and splitting of low frequency voice signals from data received.

By way of example and not of limitation, the daughterboard may comprise circuitry providing one ore more of the following features: grounding of the circuitry and subscriber lines, access to and expansion of subscriber line terminals and junctions, and control and routing of data frequency signals by data splitting, digital encoding and data filtering of low frequency signals.

The motherboard may optionally further comprise one or more daughterboard features and the daughterboard may optionally comprise at least one of the motherboard features.

In a preferred embodiment of device of the present invention, a housing protects the functional apparatus which are electrically interconnected within the housing.

The invention comprises a housing with at least one module having electrical connectors in a service provider portion and a subscriber portion for establishing electrical connection to a service provider cable and a subscriber cable. The invention preferably includes conductive fasteners to mechanically secure the module to a ground bus and establish a ground connection of a ground circuit to the ground bus, and a functional apparatus.

The invention preferably further comprises a data receiving connection adaptably formed to receive a connection from a local loop service provider such that the receipt and transmission of data to and from the local loop is conducted through the motherboard. Alternatively the motherboard may comprise the receiving connection.

The apparatus of the invention is adaptably formed to be replaceably positioned within the housing. The apparatus further comprises a plurality of adaptably mateable connections to electrically interconnect with one ore more service provider cables and subscriber cables. The apparatus further comprises a replaceable motherboard at least one replaceable daughterboard.

The motherboard includes but is not limited to circuitry to provide for core means features previously discussed herein.

The motherboard preferably comprises circuitry having electronic components and an adaptive housing connection wherein the motherboard may be replaceably secured to the housing. The motherboard further comprises a receiving connection adaptably formed to receive at least one daughterboard wherein the daughterboard is removably secured and electrically grounded to the motherboard and in which data from the motherboard may be transmitted to and received from the daughterboard. Preferably, the daughterboard is electrically grounded to the motherboard by a connection or a grounding stub.

The daughterboard is a preferred embodiment is functional to provide secondary functions and features to the subscriber at the interface device. The daughterboard includes but is not limited to circuitry secondary capable of providing secondary functional features previously described herein.

The daughterboard preferably comprises electronic circuitry having electronic components and an adaptive secondary connection wherein the daughterboard may be replaceably secured and electrically grounded to the motherboard via the receiving connection of the motherboard. The daughterboard preferably further comprises a data receiving connection adaptably formed to receive a connection from an existing on-premise telephone wiring such that the receipt and transmission of data to and from existing telephone wiring at a premise's local loop is conducted through the daughterboard. Preferably, the daughterboard further comprises at least one motherboard feature.

In another preferred embodiment, the apparatus of the invention is interconnectably positioned subsequent to an existing NID or NIU and substantially provides a local area network capability for the sharing of data.

In another preferred embodiment, the motherboards and daughterboards are within an existing interface device and are adaptably formed to be securably positioned within an existing NID, NIU and the like, such that no modification to the existing device is required.

In a further preferred embodiment, the apparatus is interconnected with an existing interface device to substantially provide for local area network capability of sharing of data.

As used herein, the terms NID, NIU, interface device, existing housing, existing interface and interface unit are used interchangeably wherein the functional characteristics of each is not meant to limit the present invention and that each and all of the physical characteristics of each housing are incorporated as a part of the improvement disclosed herein. The terms improved communications interface device improved housing, and improved device are used interchangeably without limitation and are a description of the present invention, which may include NIDs, NIUs, interface devices, and variations thereof.

Although suitable for any communication systems having NID or NIUs, the improvement and apparatus are also useable in devices and systems similarly configured to the use of telephone lines and the like. These and other objects, features and advantages of the present invention will become apparent from the following detailed description of illustrative embodiments thereof, which is to be read in connection with accompanying drawings.

DETAILED DESCRIPTION OF THE INVENTION

Figure 1:
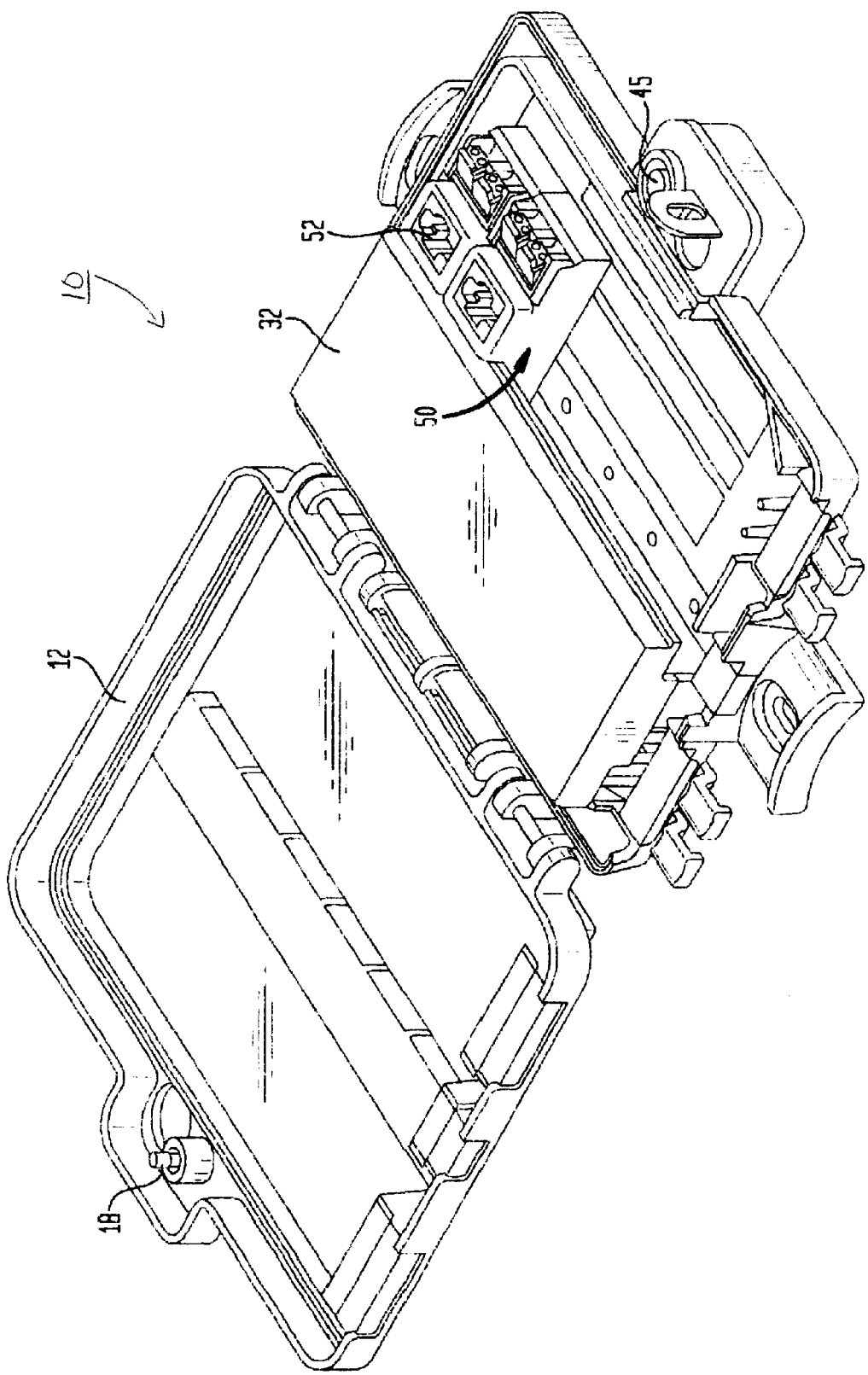
FIG. 1 depicts a Network Interface Device as is known in the art.

The preferred embodiments of the present invention and its advantages are best understood by referring to the drawings, like numerals being used for like and corresponding parts of the various drawings.

FIG. 1 depicts a Network Interface Device 10 which is known in the art and has been discussed previously.

Figure 2:
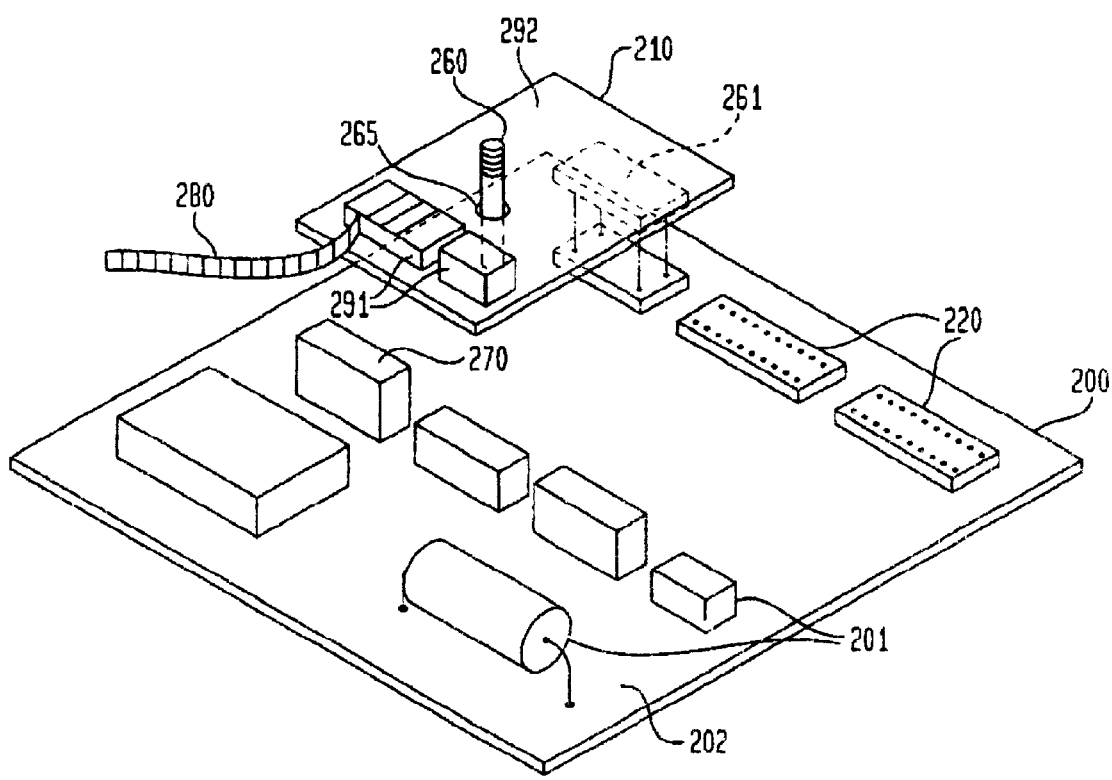
FIG. 2 depicts an embodiment of the present invention.

FIG. 2 depicts one embodiment of the present invention having a motherboard 200 and one ore more daughterboards 210. The one ore more daughterboards 210 are removably connectable to the motherboard 200, wherein one ore more receiving connectors 220 are positioned on the motherboard 200 for connection with additional daughterboards 210. The motherboard 200 includes interconnected electronic circuitry 201 on an printed or flexible circuit board 202 and provides at least one of the core functional features previously described herein.

The receiving connectors 220 are each adaptably formed and positioned to receive daughterboard 210 such that the daughterboard 210 is electrically interconnected and replaceably secured to the motherboard 200. Preferably connectors 220 further provide grounding of the daughterboard 210 with the motherboard 200. Optionally, a ground stud 260 is provided to cooperatively fit within a via 265 of the daughterboard 210 to provide ground connectivity.

The apparatus of the present invention further comprises one or more daughterboards 210 having interconnected electronic circuitry 291 on an printed or flexible circuit board 292, and provides at least one of the functional features previously described herein.

The daughterboard 210 further comprises a connecting mount 261 which is formed and positioned to be conductively and removeably interconnected with the connectors 220 of the motherboard 200. The daughterboard 210 is preferably conductively interconnected and grounded with the motherboard 200 through connection between the receiving connection 220 and the connecting mount 261. Alternatively, the daughterboard 220 is grounded with the motherboard 200 by the slidable placement of the via 265 of the daughterboard 220 with a ground stud 260 of the motherboard 200.

The motherboard 200 preferably has a loop connection 270 for receiving and transmitting the data from and to the local loop (or service provider, public switched telephone network, PSTN). Circuitry 201 of the motherboard 200 is preferably capable of receiving data, converting analog data to digital data, engaging protective measures to break the conductivity of the loop connection and interrupt the flow of data in the event of a lightning strike or other power surge, and/or routing data to the appropriate daughterboard 210. Data received by the daughterboard 210 is then transmitted to a subscriber (not shown) along a telephone line 280 connected to the daughterboard 210.

By way of example, apparatus which has failed is readily replaced. In the event of lightning strike, damaged circuitry may need to be replaced. Preferably, a lightning protection feature is provided on a daughterboard 210 and/or on motherboard 200. A new motherboard 200 or daughterboard 210 may easily replace a failed board. Motherboard 200 and daughterboard 210 may also include additional features or functionality.

Figure 3:
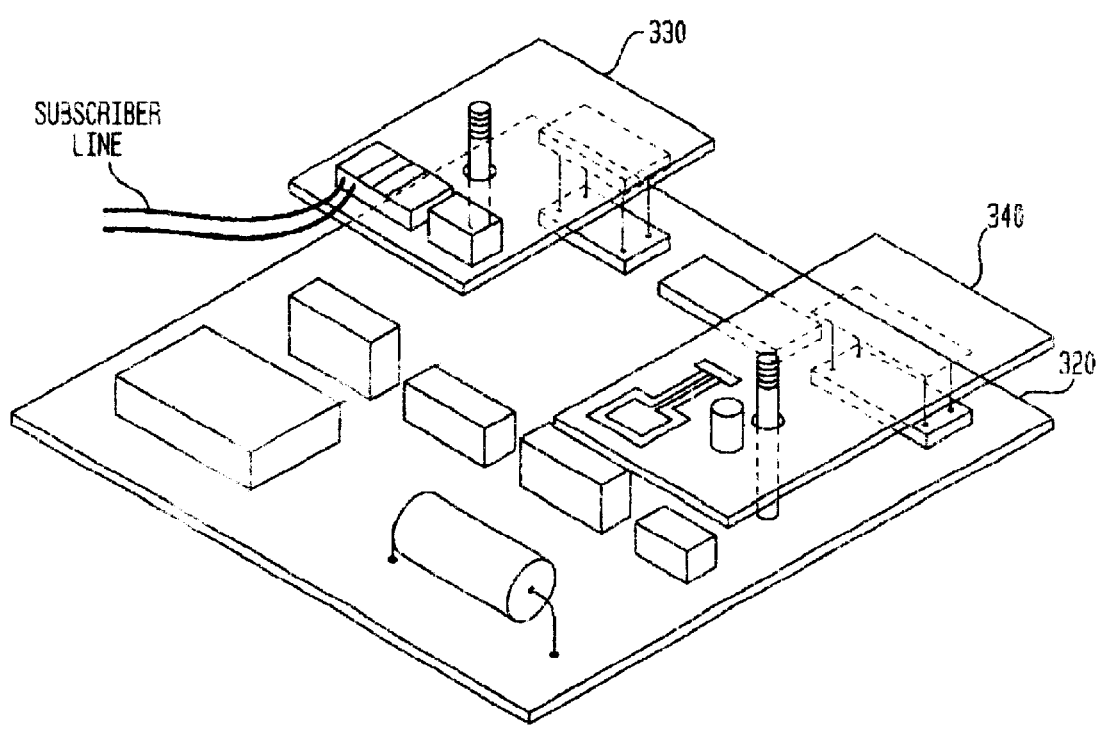
FIG. 3 depicts another embodiment of the present invention.

FIG. 3 depicts the apparatus of the present invention having a motherboard 320 and a plurality of daughterboards 330, 340.

Figure 4:
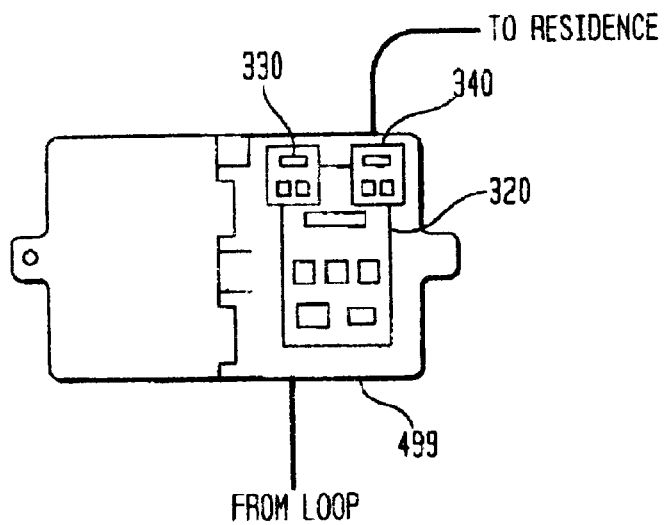
FIG. 4 depicts yet another embodiment of the present invention.

FIG. 4 depicts the motherboard 210 and daughterboards 330, 340 positioned within an existing NID 499. Motherboard 320 and daughterboards 330, 340 are preferably sized and configures fit within the NID 499 such that no physical modification to the NID 499 is required.

Figure 5:
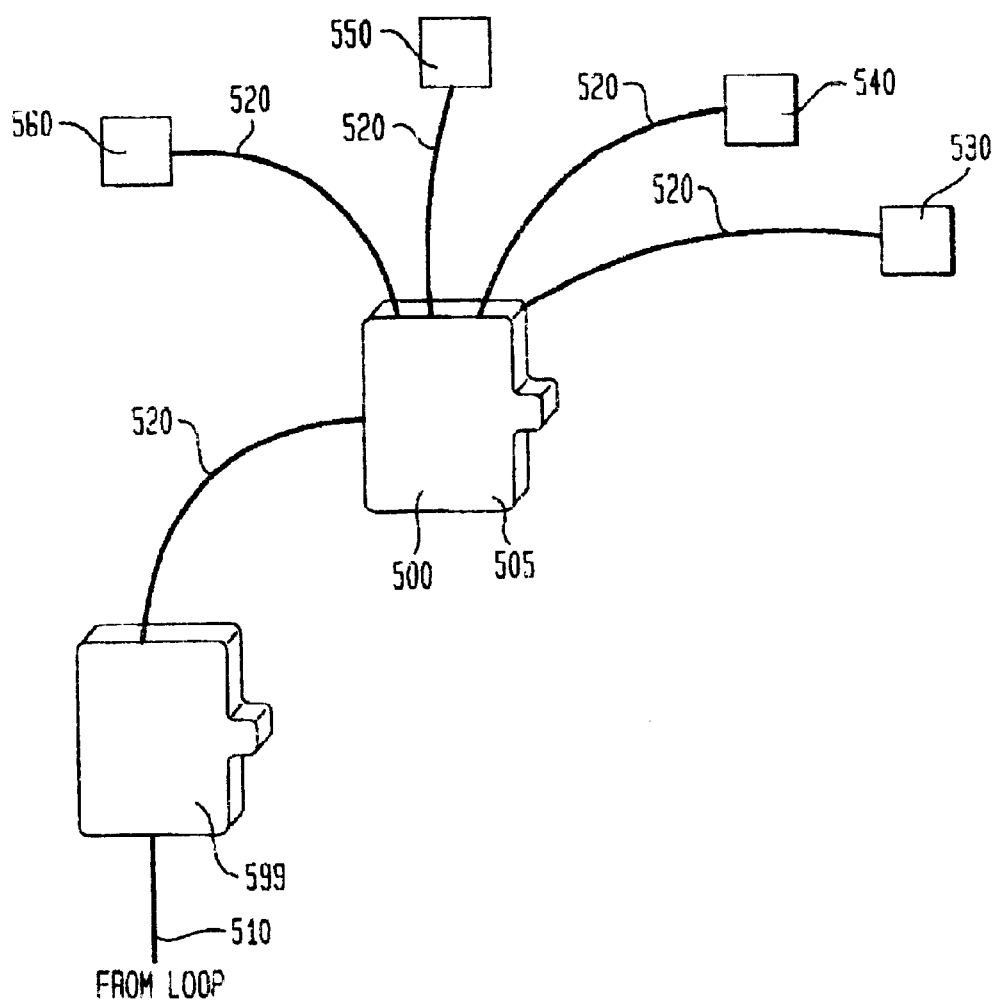
FIG. 5 depicts yet another embodiment of the present invention.

FIG. 5 depicts an NID 500 in accordance with the present invention having a housing 505 and a functional means (not shown) positioned subsequent to an existing NID 599 at a premise (not shown). Service is received from the loop 510 which is connected to existing NID 599. In the existing NID 599, a terminal junction (not shown) connects a subscriber's inside wiring 520 with the loop 510. Inside wiring 520 extends from the existing NID 599 to the NID 500 and into the premises and to a communications device 530, such as a phone, a facsimile or modem. Further, devices 540, 550, 560 can be connected with the NID 500, depending on the number of connection junctures (not shown) available. The NID 500 is connectably positioned between the existing NID 599 and communications device 530 wherein the NID 500 comprises a motherboard and one or more daughterboards. The functional features of the each NIC 500, as previously described, includes at least the ability to share data across existing phone wiring such that a subscriber is able to use the internal wiring 520 to communicate with different communication devices 540, 550, 560 as though there existed a LAN within the premises.

Although the invention has been described in preferred embodiments with reference to the accompanying drawings, it can be readily understood that the invention is not restricted to such preferred embodiments, and that various changes and modifications can be made by those skilled in the art without departing from the spirit and scope of the invention.

What is claimed:

1. A network interface device comprising:
   an interface housing;
   a motherboard including a plurality of first connectors physically attached to said motherboard, and a plurality of first electronic circuitry components physically attached to said motherboard and for electrical connection to one or more service provider cables;
   at least one daughterboard, each daughterboard having a second connector physically attached to said daughterboard for physically and electrically, removably mating to one of said plurality of first connectors of said motherboard, each daughterboard including second electronic circuitry components for electrical connection to a subscriber's line, and wherein said second electronic circuitry components become electrically connected to said first electronic circuitry components via the mating of said first and second connectors; and wherein said first and/or second electronic circuitry components are capable of providing one or more functional features selected from the group consisting of: access to additional bandwidth, sharing of bandwidth, access to high-speed and multimedia data, distribution of data by residential gateways and/or across existing telephone wiring, access to cable related data, analog to digital conversion of data, and power surge damage-protection.

2. The device of claim 1, further comprising:
a ground connection established between said motherboard and each of said at least one daughterboard.

3. The device of claim 2, wherein said ground connection is established via said first and second connectors.

4. The device of claim 2, wherein said ground connection is established via a ground stud connecting said motherboard to said at least one daughterboard.

5. The device of claim 1, wherein said first and/or second electronic circuitry components are capable of providing access to additional bandwidth.

6. The device of claim 1, wherein said first and/or second electronic circuitry components are capable of providing sharing of bandwidth.

7. The device of claim 1, wherein said first and/or second electronic circuitry components are capable of providing access to high-speed and multimedia data.

8. The device of claim 1, wherein said first and/or second electronic circuitry components are capable of providing distribution of data by residential gateways and/or across existing telephone wiring.

9. The device of claim 8, wherein said first and/or second electronic circuitry components are capable of providing local area network connectivity.

10. The device of claim 8, wherein said first and/or second electronic circuitry components are capable of providing local area network connectivity of existing subscriber lines.

11. The device of claim 1, wherein said first and/or second electronic circuitry components are capable of providing access to cable related data.

12. The device of claim 1, wherein said first and/or second electronic circuitry components are capable of providing analog to digital conversion of data.

13. The device of claim 1, wherein said first and/or second electronic circuitry components are capable of providing power surge damage-protection.

* * * * *